US012715381B2

(12) United States Patent
Royer et al.

(10) Patent No.: US 12,715,381 B2
(45) Date of Patent: Aug. 25, 2026

(54) ASSEMBLY FOR A MOTOR VEHICLE, COMPRISING A BUMPER BEAM AND TWO ABSORBERS

(71) Applicant: STELLANTIS AUTO SAS, Poissy (FR)

(72) Inventors: Guillaume Royer, Bruyeres le Chatel (FR); Rodolphe Peron, Herblay (FR); Thibault Gourvennec, Draveil (FR)

(73) Assignee: Stellantis Auto SAS, Poissy (FR)

( * ) Notice: Subject to any disclaimer, the term of this patent is extended or adjusted under 35 U.S.C. 154(b) by 365 days.

(21) Appl. No.: 18/563,773

(22) PCT Filed: May 10, 2022

(86) PCT No.: PCT/FR2022/050893
§ 371 (c)(1),
(2) Date: Nov. 22, 2023

(87) PCT Pub. No.: WO2022/263735
PCT Pub. Date: Dec. 22, 2022

(65) Prior Publication Data

US 2024/0270191 A1 Aug. 15, 2024

(30) Foreign Application Priority Data

Jun. 14, 2021 (FR) ...................................... 2106223

(51) Int. Cl.
*B60R 19/34* (2006.01)
*B21D 53/88* (2006.01)
(Continued)

(52) U.S. Cl.
CPC .............. *B60R 19/34* (2013.01); *B21D 53/88* (2013.01); *B60R 19/023* (2013.01); *B60R 19/18* (2013.01); *B60R 2019/1806* (2013.01)

(58) Field of Classification Search
CPC .................................................... B60R 19/247
See application file for complete search history.

(56) References Cited

U.S. PATENT DOCUMENTS 1,546,947 A 7/1925 Sohl
6,695,368 B1 2/2004 Weykamp et al.
(Continued)

FOREIGN PATENT DOCUMENTS

| | | |
|---|---|---|
| CN | 211223333 U | 8/2020 |
| FR | 3093045 A1 | 8/2020 |
| WO | 2017083997 A1 | 5/2017 |

OTHER PUBLICATIONS

International Search Report for corresponding PCT/FR2022/050893 mailed Aug. 5, 2022.
(Continued)

*Primary Examiner* — Nicholas McFall
(74) *Attorney, Agent, or Firm* — Sandberg Phoenix & von Gontard, PC

(57) ABSTRACT

The invention relates to an assembly (10) for a bumper device of a motor vehicle, comprising at least one bumper beam (12) and two absorbers (14); the bumper beam (12) is formed by an elongate hollow body comprising two ends at which the absorbers (14) are attached; the assembly (10) further comprises two modular extension pieces (18); each modular extension piece comprising a body (20) with a first portion attached to one end of the bumper beam (12), and a second portion projecting from the end in a longitudinal direction of the bumper beam (12). A lateral absorption plate (24) is further arranged at the end of the second body part (20) of each modular extension piece (18) and extends laterally to the absorbers (14), preferably parallel to the absorbers.

8 Claims, 2 Drawing Sheets

(51) Int. Cl.
*B60R 19/02* (2006.01)
*B60R 19/18* (2006.01)

(56) References Cited

U.S. PATENT DOCUMENTS

| | | | | |
|---|---|---|---|---|
| 2015/0151698 | A1 | 6/2015 | Lee et al. | |
| 2017/0151919 | A1 | 6/2017 | Kashiwagi et al. | |
| 2017/0274849 | A1 | 9/2017 | Jordan | |
| 2021/0370858 | A1* | 12/2021 | Hamano | B60R 19/18 |

OTHER PUBLICATIONS

Written Opinion for corresponding PCT/FR2022/050893 mailed Aug. 5, 2022.

* cited by examiner

[Fig. 1]
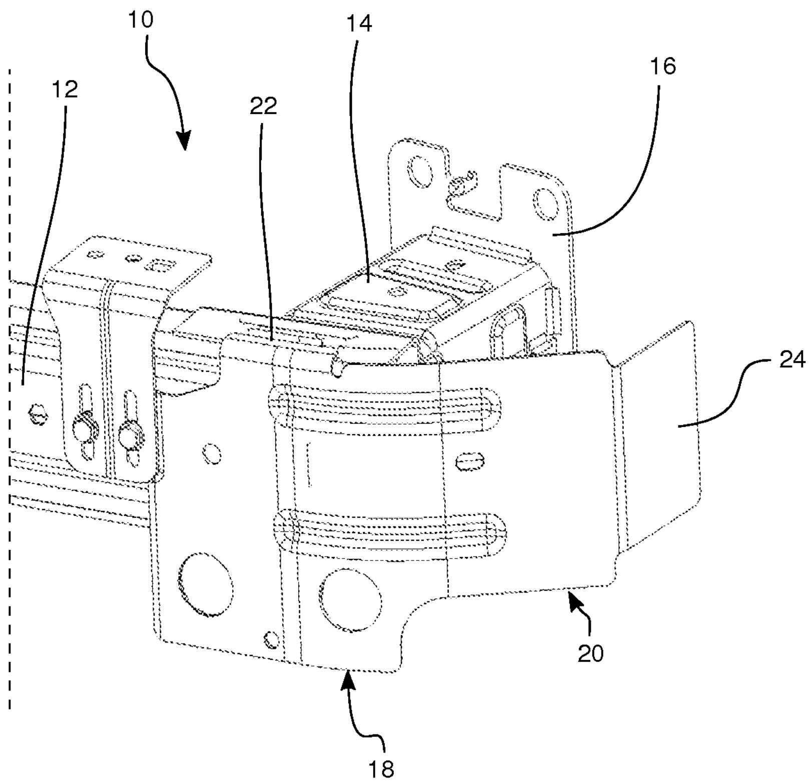
[Fig. 2]
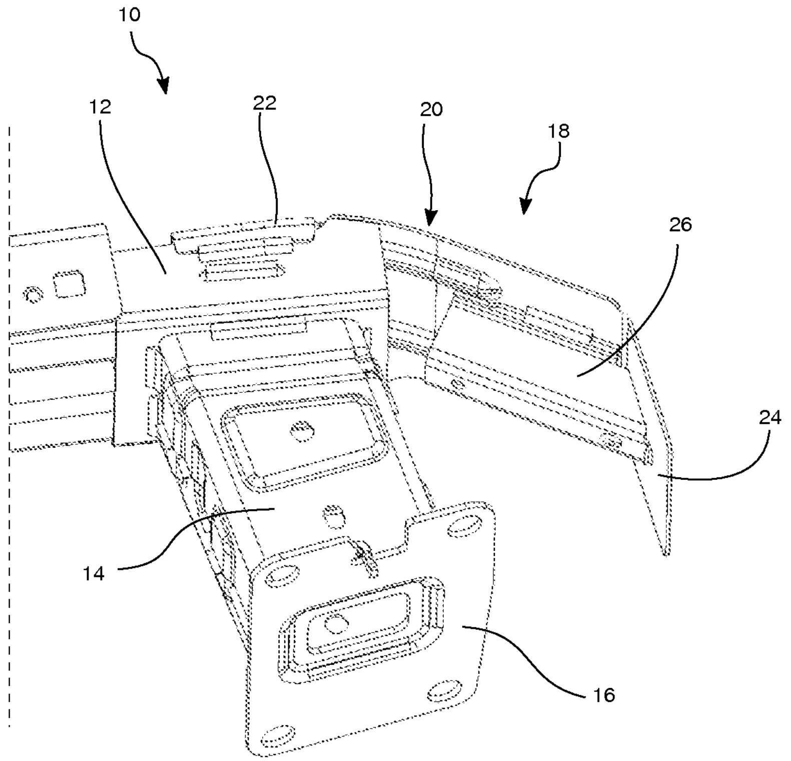

[Fig. 3]
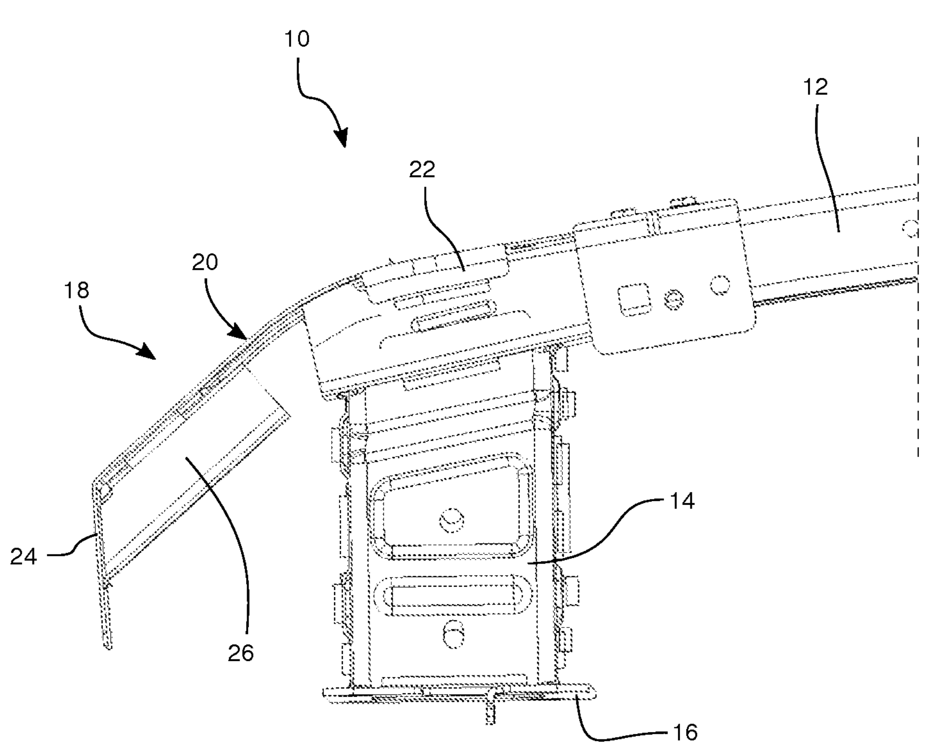

ASSEMBLY FOR A MOTOR VEHICLE, COMPRISING A BUMPER BEAM AND TWO ABSORBERS

CROSS-REFERENCE TO RELATED APPLICATIONS

This application is the US National Stage under 35 USC § 371 of International Application No. PCT/FR2022/050893, filed May 10, 2022, which claims the priority of the French application 2106223 filed on Jun. 14, 2021, the content (text, drawings and claims) of both said applications being incorporated by reference herein.

BACKGROUND

The present devices and methods relate to the field of bumpers for motor vehicles. They relate more particularly to an assembly for a motor vehicle comprising a bumper beam, and two absorbers, as well as a vehicle comprising such an assembly.

A motor vehicle generally comprises at least one bumper device, also called an impact absorption system. The bumper device may comprise at least one assembly comprising a transverse bumper beam, for example a high beam and a low beam, and at least two longitudinal absorbers associated with each beam. The assembly may also comprise plates enabling the device to be attached to the structure of the vehicle.

The production of such an assembly must comply with numerous services, in particular impact tests. These impact tests are not all regulated in the same way across the different geographical areas in which the vehicle is to be marketed.

For example, vehicles intended for the North American market must meet a small overlap impact protocol with a lateral force component. In this test, the vehicle is subjected to an impact with small overlap at one end of the bumper. This impact comprises a transverse force component. In this case, it is necessary to absorb this transverse component so as to ensure the vehicle's repairability.

Such a test protocol does not impose the same constraints on vehicles intended for the European market. In particular, in Europe, the vehicle is not subjected to an impact comprising a transverse force component.

In order to limit production costs, it is sought to design vehicle outlines that are easily adaptable to the constraints of the various market regions.

Document WO 2017/083997 discloses a shock absorber device placed on the front bumper of a vehicle. The bumper device comprises several layers making it possible to absorb energy during an impact, and a panel comprising lateral protuberances. The lateral protuberances do not comprise means for absorbing the lateral components of the forces during an impact.

The document CN211223333 relates to a motor vehicle comprising a bumper device with detachable wings attached laterally to the front bumper used to absorb energy in the event of shocks. These wings are detachable to facilitate the transportation of the bumper device. This document does not provide for the absorption of the transverse components of the impacts.

SUMMARY

The present methods and devices aim to solve at least one of the problems and/or disadvantages mentioned hereinbefore. In particular, the aim is to propose an overall simple solution for a bumper device of a motor vehicle that makes it possible to meet the constraints of a small overlap impact protocol with a lateral force component, and comprising parts that can be used in assemblies intended for different geographical regions.

To this end, and according to a first aspect, the described methods and devices relate to an assembly for a bumper device of a motor vehicle comprising at least one bumper beam and two absorbers, the bumper beam is formed by an elongate hollow body comprising two ends at which the absorbers are attached; the assembly further comprises two modular extension pieces; each modular extension piece comprising a body with a first part attached to one end of the bumper beam, and a second part projecting from the end in a longitudinal direction of the bumper beam. The assembly is remarkable in that a lateral absorption plate is further arranged at the end of the second body part of each modular extension piece, and extends parallel to the absorbers.

The lateral absorption plate of the modular extension pieces constitutes a simple expansion thereof. The lateral absorption plate is an element making it possible to absorb the transverse components of small overlap impacts according to the standards in force in the United States. The extension piece is said to be modular since, in order to adapt the assembly to a market in which the standards in force are less restrictive, the lateral absorption plate can be easily cut to reduce the mass of the assembly and decrease vehicle consumption.

In some embodiments, each modular extension piece further comprises at least one reinforcing element, attached on the one hand to the body, and on the other hand to the lateral absorption plate.

The reinforcing element makes it possible to increase the rigidity of the modular extension piece, and therefore the use of a smaller thickness of material for said modular extension piece. The reinforcing element also makes it possible to improve the behavior of the modular extension piece in the event of impacts, preventing the body from folding.

Preferably, the lateral absorption plate is formed from the same part as the body of the modular extension piece. This solution is economical and simple to carry out.

In alternative embodiments, the lateral absorption plate is an added part attached to the modular extension piece by welding and/or by means of the reinforcing element. Preferably, the lateral absorption plate is formed from the same part as the reinforcing element.

Regardless of the embodiment chosen, at least one reinforcing element is preferably formed by a hollow body; preferably formed by a U-shaped profiled element. A hollow body of profiled type is rigid while saving on material.

In some embodiments, at least one reinforcing element is formed by a plate welded to the body and to the lateral absorption plate; preferably each modular extension piece comprises at least two reinforcing elements and therefore has at least two superimposed plates welded to the body and to the lateral absorption plate.

Preferably, each reinforcing element extends over the body of the modular extension piece over a distance of less than 80% of the distance between the lateral absorption plate and the end of the bumper beam; preferably over a distance of less than 70%.

This allows the modular extension piece to fold without the reinforcing element coming into contact with the bumper beam, which would hinder the deformation of the modular extension piece. This avoids a risk of the modular extension piece breaking.

Preferably, each modular extension piece being able to deform toward a crushing position in the event of an impact, the assembly is remarkable in that in the crushing position, the reinforcing element is in contact with an absorber or a plate of an absorber, so as to limit the risks of the modular extension piece breaking.

In some embodiments, the absorbers comprising an end attached to the bumper beam and another end equipped with a fastening plate, each modular extension piece being able to deform toward a crushing position in the event of an impact, the assembly is remarkable in that each lateral absorption plate is sized so that in the crushing position, the lateral absorption plate is in contact with an absorber or a plate of an absorber.

The sizing of the lateral absorption plate makes it possible to ensure the transmission of forces to the absorber plates and/or the absorbers, and consequently to longitudinal beams of the structure of the vehicle, rather than toward the absorbers which are not configured to absorb lateral impact components.

Preferably, the second part of the body of the modular extension piece forms an angle with the bumper beam. This makes it possible to increase the curve of the bumper beam to adapt to the style, and protects the technicians from the cutting edges of the bumper beam during assembly.

According to a second aspect, the described methods and devices relate to a motor vehicle with at least one bumper device comprising at least one assembly according to the first aspect.

According to a third aspect, the described methods and devices relate to a modular extension piece intended to be mounted in an assembly according to the first aspect, the modular extension piece comprising an elongate flat body with a first part comprising means for fastening to a bumper beam, a second part as an extension of the first part; preferably forming an angle with the first part. The modular extension piece is remarkable in that it further comprises a lateral absorption plate formed from the same part as the second part, in its extension, and forming an angle with the second part; preferably an angle between 90° and 180°; preferably an angle between 110° and 150°.

According to a fourth aspect, the described methods and devices relate to a method for producing a modular extension piece intended for an assembly for a motor vehicle comprising at least one bumper beam, two absorbers, and at least two modular extension pieces.

The method is remarkable in that it comprises at least one step of forming each modular extension piece comprising a body and a lateral absorption plate formed from the same part as the body, by stamping and/or stamping, and in that it further comprises a step selected from a step of fastening a rigid reinforcing element, attached on the one hand to the body, and on the other hand to the lateral absorption plate to form an assembly according to the first aspect; or a step of cutting each lateral absorption plate, in order to remove it.

Such a method comprises an alternative with a cut-out that allows a weight reduction when the assembly is intended for a vehicle that will not be used on the North American market.

BRIEF DESCRIPTION OF THE FIGURES

The methods and devices relate will be well understood and other aspects and advantages will become clear from reading the following description given by way of example with reference to the appended drawings, wherein:

FIG. 1 is a perspective front view of a detail of an assembly for a bumper device of a motor vehicle according to one embodiment.

FIG. 2 is a perspective rear view of a detail of an assembly for a bumper device of a motor vehicle according to one embodiment.

FIG. 3 is a top view of FIG. 2.

DETAILED DESCRIPTION

In the remainder of the description, the term “comprise” is synonymous with “include” and is not limiting in that it allows the presence of other elements in the assembly, the modular extension piece, of the vehicle, or other steps of the method to which it refers. It is understood that the term “comprise” includes the term “consist of”.

Likewise, the terms “lower”, “upper”, “top” and “bottom” will be understood according to their usual definition, in which the terms “lower” and “bottom” indicate greater proximity to the ground in the vertical direction than the terms “upper” and “top”, respectively.

The terms “longitudinal”, “transverse”, “front” and “rear” will be understood relative to the general orientation of the vehicle as taken in its normal driving direction.

A motor vehicle comprises at least one bumper device, which comprises at least one assembly 10, a detail of which is shown in FIG. 1. The assembly 10 comprises at least one bumper beam 12 and two absorbers 14, only one of which is shown in FIGS. 1 to 3.

The bumper beam 12 is formed by an elongate hollow body comprising two ends to which the absorbers 14 are fixed. The bumper beam 12 may be a straight or curved beam so as to adapt to the vehicle’s outline.

The absorbers 14 are elongated pieces which can have a variable length depending on the needs according to the type and outline of the vehicle. They extend in a direction substantially perpendicular to the longitudinal direction of the bumper beam. The absorbers 14 comprise one end attached to the bumper beam and another end that can be equipped with an expansion, not shown, or a fastening plate 16 to fasten them to the vehicle structure.

The assembly further comprises two modular extension pieces 18, only one of which is shown in FIGS. 1 to 3.

Since the arrangement of the assembly is symmetrical relative to a median transverse plane of the bumper beam, a person skilled in the art will easily be able to design the assembly from the details shown in FIGS. 1 to 3.

The modular extension piece 18 is a metal piece, such as for example one made of steel, which is added to the bumper beam 12. The modular extension piece can be formed by a piece of steel sheet. For example, a piece of sheet metal has a thickness between 1.0 and 2.5 mm; preferably between 1.2 and 2.0 mm.

The modular extension piece can be attached to a front face of the bumper beam, that is to say on a face opposite the face to which the absorber is attached. The modular extension piece 18 is attached to the bumper beam by any means, and preferably by welding.

The modular extension piece 18 comprises a body 20, which is advantageously an elongate body. The body 20 comprises a first part attached to an end of the bumper beam, and a second part projecting from the end in a longitudinal direction of the bumper beam. In the context of a curved beam, this is understood to be the mean longitudinal direction.

The body 20. The first part of the body may comprise means for fastening the body to the bumper beam 12, such as for example one or more tabs 22 for fastening the body 20 by welding. In the example of FIGS. 1 to 3, the body comprises a tab 22 for fastening to an upper face of the bumper beam 12.

The second part extends as an extension of the first part, and preferably forms an angle with the first part. The angle of the second part is generally chosen to increase the bumper beam end curve and satisfy stylistic constraints. This angle can also allow the body 20 to at least partially cover the end of the bumper beam so as to protect the technicians from the sharp edges of the bumper beam during assembly.

The body 20 may also comprise stiffening elements such as ribs, corrugations, etc.

A lateral absorption plate 24 is further arranged at the end of the second part of the body of the modular extension piece 18, and extends laterally to the absorber 14. The lateral absorption plate 22 extends the modular extension piece 18 towards the absorber, that is, within the framework of a front bumper device, toward the rear of the vehicle, and vice versa. The lateral absorption plate 22 can form an angle with the body 20 so as to be preferably parallel or substantially parallel to the absorber. The angle formed between the second part of the body 20 of the modular extension piece 18 is preferably an angle between 90° and 180°. Preferably an angle between 100° and 160°. Preferably an angle between 110° and 150°. Preferably an angle between 110° and 140°.

The lateral absorption plate 24 can be formed from the same part as the body of the modular extension piece 18, as shown in FIGS. 1 to 3. Alternatively, the lateral absorption plate may also be an added part attached to the modular extension piece, preferably by welding.

As shown in FIGS. 2 and 3, in embodiments, the modular extension piece 18 further comprises at least one rigid reinforcing element 26, attached on the one hand to the body 20, and on the other hand to the lateral absorption plate 24. The reinforcing element 26 is attached to faces of the modular extension piece 18 which are in the direction of the absorbers as shown in FIGS. 2 and 3.

The reinforcing element 26 can be formed by a plate welded to the body and to the lateral absorption plate, a hollow body, or any other type of element making it possible to reinforce the rigidity of the modular extension piece 18.

In the embodiments of FIGS. 2 and 3, the assembly comprises a reinforcing element 26 formed by a hollow body welded to the body and to the lateral absorption plate; preferably, the hollow body is a U-shaped profiled element which may comprise fastening tabs.

In embodiments not shown, the modular extension piece comprises a reinforcing element formed by a metal plate welded to the body and to the lateral absorption plate, or comprises two reinforcing elements formed by two superimposed metal plates welded to the body and to the lateral absorption plate.

In embodiments not shown, the reinforcing element may be formed from the same part as the lateral absorption plate. In this case, the lateral absorption plate is preferably a piece added to the body of the modular extension piece. The lateral absorption plate can then be attached to the body of the modular extension piece by means of the reinforcing element.

The reinforcing element 26 may comprise stiffening elements such as ribs, corrugations, etc.

During an impact with a transverse component at the modular extension piece 18, the modular extension piece deforms, and the second part of the body and the lateral absorption plate move in the direction of the absorber, to a crushing position. In order not to hinder the deformation of the modular extension piece 18, the reinforcing element 26 extends over the body 20 of the modular extension piece over a distance of less than 80% of the distance between the lateral absorption plate 24 and the end of the bumper beam 12; preferably over a distance of less than 70%.

The lateral absorption plate 24 can be sized so that in the crushing position of the modular extension piece 18, the lateral absorption plate is in contact with an absorber 14 or a plate 16 of an absorber.

A method for producing a modular extension piece intended for an assembly for a motor vehicle comprising at least one bumper beam, two absorbers, and at least two modular extension pieces can make it possible to obtain a modular extension piece capable of absorbing shocks with a lateral component, or a lightened modular extension piece. The method comprises at least one step of forming each modular extension piece comprising a body and a lateral absorption plate formed from the same part as the body, by deep drawing and/or die stamping.

The method further comprises a step of fastening a rigid reinforcing element, attached on the one hand to the body, and on the other hand to the lateral absorption plate for the formation of an assembly for a bumper device of a vehicle as described above; or a step of cutting each lateral absorption plate.

The invention claimed is:

1. An assembly for a bumper device of a motor vehicle comprising at least one bumper beam and two absorbers; the bumper beam is formed by an elongate hollow body comprising two ends at which the absorbers are attached; the assembly further comprises two modular extension pieces; each modular extension piece comprising a body with a first part attached to one end of the bumper beam, and a second part projecting from the end of the bumper beam in a longitudinal direction of the bumper beam; wherein a lateral absorption plate is further arranged at an end of the second part of the body of each modular extension piece, and extends laterally to the absorbers; parallel to the absorbers;

wherein each modular extension piece further comprises at least one reinforcing element attached to the body and attached to the lateral absorption plate; and wherein each reinforcing element extends over the body of the modular extension piece over a distance of less than 70% of a distance between the lateral absorption plate and the end of the bumper beam.

2. The assembly according to claim 1, wherein the lateral absorption plate is formed from the same part as the body of the modular extension piece.

3. The assembly according to claim 2, wherein the modular extension piece comprises an elongate body with a first part comprising means for fastening to a bumper beam, a second part that is an extension of the first part and forms an angle with the first part; wherein the modular extension piece further comprises a lateral absorption plate formed from the second part, the lateral absorption plate forming an angle with the second part between 90° and 180°.

4. The assembly according to claim 1, wherein the lateral absorption plate is an added part attached to the modular extension piece.

5. The assembly according to claim 1, wherein the at least one reinforcing element is formed by a hollow body; U-shaped profiled element.

6. The assembly according to claim 1, wherein the at least one reinforcing element is formed by a plate welded to the body and to the lateral absorption plate.

7. A motor vehicle with at least one bumper device comprising at least one assembly according to claim 1.

8. A method for producing an assembly for a bumper device wherein the method comprises providing the assembly for a bumper device of claim 1; at least one step of forming each modular extension piece comprising a body and a lateral absorption plate formed as a same part as the body, and in that it further comprises a step of fastening the at least one reinforcing element, attached to the body, and to the lateral absorption plate.

* * * * *